United States Patent
Yoakim et al.

(10) Patent No.: US 9,693,652 B2
(45) Date of Patent: Jul. 4, 2017

(54) BEVERAGE MACHINE FOR A NETWORK

(75) Inventors: Alfred Yoakim, St-legier-la Chiesaz (CH); Fabien Ludovic Agon, Le Bouveret (CH)

(73) Assignee: Nestec S.A., Vevey (CH)

( * ) Notice: Subject to any disclaimer, the term of this patent is extended or adjusted under 35 U.S.C. 154(b) by 1199 days.

(21) Appl. No.: 13/393,674

(22) PCT Filed: Sep. 1, 2010

(86) PCT No.: PCT/EP2010/062781
§ 371 (c)(1),
(2), (4) Date: Mar. 1, 2012

(87) PCT Pub. No.: WO2011/026853
PCT Pub. Date: Mar. 10, 2011

(65) Prior Publication Data
US 2012/0152125 A1    Jun. 21, 2012

(30) Foreign Application Priority Data
Sep. 2, 2009   (EP) ..................... 09169211

(51) Int. Cl.
*A47J 31/00*   (2006.01)
*A47J 31/52*   (2006.01)

(52) U.S. Cl.
CPC ............ *A47J 31/52* (2013.01); *A47J 31/002* (2013.01)

(58) Field of Classification Search
CPC ........... A47J 31/52; A47J 31/56; A47J 31/047
USPC ................... 99/280, 281, 282, 283
See application file for complete search history.

(56) References Cited

U.S. PATENT DOCUMENTS

| | | |
|---|---|---|
| 4,377,049 A | 3/1983 | Simon et al. |
| 4,458,735 A | 7/1984 | Houman |
| 4,554,419 A | 11/1985 | King et al. |
| 4,767,632 A | 8/1988 | Meier |
| 4,954,697 A | 9/1990 | Kokubun et al. |
| 5,312,020 A | 5/1994 | Frei |
| 5,335,705 A | 8/1994 | Morishita et al. |
| 5,372,061 A | 12/1994 | Albert et al. |
| 5,375,508 A | 12/1994 | Knepler et al. |
| 5,645,230 A | 7/1997 | Marogna et al. |

(Continued)

FOREIGN PATENT DOCUMENTS

| | | |
|---|---|---|
| AT | 410377 | 10/2008 |
| CH | 682798 | 11/1993 |

(Continued)

OTHER PUBLICATIONS

PCT International Search Report for Application No. PCT/EP2010/062781 mailed on Jan. 26, 2011.

(Continued)

*Primary Examiner* — Reginald L Alexander
(74) *Attorney, Agent, or Firm* — K&L Gates LLP

(57) ABSTRACT

A beverage preparation machine (1) comprises: an arrangement (40) for processing one or more beverage ingredients to dispense a beverage; a control unit (21) connected to the ingredient processing arrangement for controlling the processing of such one or more beverage ingredients; and a communication module (11) for communication with an external network (50, 511). The communication module (11) is prevented from controlling the ingredient processing arrangement (40).

17 Claims, 2 Drawing Sheets

(56) References Cited

U.S. PATENT DOCUMENTS

| | | | |
|---|---|---|---|
| 5,731,981 A | 3/1998 | Simard | |
| 5,836,236 A | 11/1998 | Rolfes et al. | |
| 5,959,869 A | 9/1999 | Miller et al. | |
| 6,182,555 B1 | 2/2001 | Scheer et al. | |
| 6,256,693 B1 | 7/2001 | Platko | |
| 6,354,341 B1 | 3/2002 | Saveliev et al. | |
| 6,759,072 B1 | 7/2004 | Gutwein et al. | |
| 7,151,968 B2 * | 12/2006 | Williamson | 700/65 |
| 7,455,867 B1 * | 11/2008 | Gutwein et al. | 426/594 |
| 8,309,030 B2 * | 11/2012 | Rinker et al. | 210/203 |
| 8,371,211 B2 * | 2/2013 | Nosler et al. | 99/279 |
| 8,495,950 B2 * | 7/2013 | Fedele et al. | 99/299 |
| 2002/0130136 A1 | 9/2002 | Segal | |
| 2003/0058274 A1 | 3/2003 | Hill et al. | |
| 2003/0070555 A1 * | 4/2003 | Reyhanloo | 99/282 |
| 2005/0033646 A1 | 2/2005 | Crisp, III | |
| 2005/0034606 A1 | 2/2005 | In Albon | |
| 2005/0154644 A1 | 7/2005 | Deakin et al. | |
| 2007/0157820 A1 | 7/2007 | Bunn | |
| 2007/0235465 A1 | 10/2007 | Walker et al. | |
| 2009/0179042 A1 | 7/2009 | Milan et al. | |
| 2011/0041696 A1 | 2/2011 | Aemisegger et al. | |
| 2012/0152125 A1 | 6/2012 | Yoakim | |

FOREIGN PATENT DOCUMENTS

| | | |
|---|---|---|
| DE | 4429353 | 2/1996 |
| DE | 20200419 | 5/2002 |
| DE | 202006019039 | 3/2007 |
| DE | 202009003896 | 5/2009 |
| EP | 1302138 | 4/2003 |
| EP | 1448084 | 8/2004 |
| EP | 1676509 | 7/2006 |
| EP | 1810598 | 7/2007 |
| EP | 2085000 | 8/2009 |
| EP | 2300893 | 3/2011 |
| FR | 2624844 | 6/1989 |
| GB | 2397510 | 7/2004 |
| WO | WO 9725634 | 7/1997 |
| WO | WO 9950172 | 10/1999 |
| WO | 03005295 | 1/2003 |
| WO | WO 03037151 | 5/2003 |
| WO | WO 2004030435 | 4/2004 |
| WO | WO 2004030438 | 4/2004 |
| WO | 2006050563 | 5/2006 |
| WO | WO 2006063645 | 6/2006 |
| WO | WO 2006090183 | 8/2006 |
| WO | WO 2007003062 | 1/2007 |
| WO | WO 2007003990 | 1/2007 |
| WO | 2008001344 | 1/2008 |
| WO | WO 2008104751 | 9/2008 |
| WO | WO 2008138710 | 11/2008 |
| WO | WO 2008138820 | 11/2008 |
| WO | 2009004611 | 1/2009 |
| WO | WO 2009016490 | 2/2009 |
| WO | WO 2009074550 | 6/2009 |

OTHER PUBLICATIONS

Written Opinion of the PCT International Searching Authority for Application No. PCT/EP2010/062781 mailed on Jan. 26, 2011.
Australian Statement of Grounds and Particulars for Application No. 2010291241, dated Apr. 27, 2017, 17 pages.

* cited by examiner

BEVERAGE MACHINE FOR A NETWORK

CROSS REFERENCE TO RELATED APPLICATIONS

The present application is a National Stage of International Application No. PCT/EP2010/062781, filed on Sep. 1, 2010, which claims priority to European Patent Application No. 09169211.1, filed on Sep. 2, 2009, the entire contents of which are being incorporated herein by reference.

FIELD OF THE INVENTION

The field of the invention pertains beverage preparation machines that are configured to be connected to a data exchange network such as the internet.

For the purpose of the present description, a "beverage" is meant to include any liquid food, such as tea, coffee, hot or cold chocolate, milk, soup, baby food, etc. . . . .

BACKGROUND ART

Certain beverage preparation machines use capsules containing ingredients to be extracted or to be dissolved; for other machines, the ingredients are stored and dosed automatically in the machine or else are added at the time of preparation of the drink.

Most coffee or other beverage machines possess filling means that include a pump for liquid, usually water, which pumps the liquid from a source of water that is cold or indeed heated through heating means, such as a heating resistor, a thermoblock or the like. Such filling means are usually controlled via a control unit of the machine, typically including a printed circuit board with a controller.

For allowing the user to interact with such machines, for providing operation instructions to the machine or obtaining feed-back therefrom, various systems have been disclosed in the art, for instance as mentioned in the following references: AT 410 377, CH 682 798, DE 44 29 353, DE 202 00 419, DE 20 2006 019 039, DE 2007 008 590, EP 1 302 138, EP 1 448 084, EP 1 676 509, EP 2 085 000, EP 08155851.2, FR 2 624 844, GB 2 397 510, U.S. Pat. Nos. 4,377,049, 4,458,735, 4,554,419, 4,767,632, 4,954,6975,312,020, 5,335,705, 5,372,061, 5,375,5085,731,981, 5,645,230, 5,836,236, 5,959,869, 6,182,555, 6,354,341, 6,759,072, US 2005/0154644, US 2007/0157820, WO 97/25634, WO99/50172, WO 2004/030435, WO 2004/030438, WO 2006/063645, WO 2006/090183, WO 2007/003062, WO 2007/003990, WO 2008/104751, WO 2008/138710, WO 2008/138820 and WO 2009/016490.

US 2005/0154644 very generally discloses a product container, such as a vending or fountain machine, for supplying purchasable products of any kind such as tickets, music, pictures and digital content. The machine is connected wirelessly to an external network for communicating with a content server. Information retrieved from the content server may be displayed to a consumer and/or used to identify an item selectable by the consumer, such as a free item receivable by the consumer after purchasing a product and/or a purchasable item such as tickets, music, pictures and/or digital content.

WO 2009/016490 discloses a beverage dispenser having different beverage modules connected to a control unit with a graphic user interface (GUI) displaying automatically re-arrangeable virtual buttons. The control unit is re-programmed via a network to modify the operation of the modules, in particular the user interface, and for exchanging information about the operation of the machine.

EP 1 302 138 discloses a beverage machine connected to a network. The machine is arranged to communicate with a distant server to carry out diagnosis of the beverage machine and to update the machine's control software via the network.

EP 2 085 000 schematically discloses a coffee machine that has a coffee preparation module coupled via a controller to a user-interface and to a network interface for an external network. The machine further includes a sensor for sensing food components used by the coffee preparation module, the sensor being coupled to the controller so that responsive information may be retrieved from the network regarding the food component sensed by the sensor and then presented to the user. The responsive information retrieved from the network may be used to reprogram (update) the coffee machine to alter the coffee brewing process, i.e. alter the operation of the coffee preparation module via the external network, especially when the food component is new. The external network may also be used to avoid complex reprogramming of the coffee preparation module by downloading user-preferences and parameterize automatically via the network the coffee preparation module.

Beverage preparation machines that can be integrated in a network such as the internet are well known. Typically, such a network integration allows remote control or remote software upgrading of the beverage preparation machine, e.g. as described in the above references.

However, networked beverage preparation machines are exposed to malware and other unsuitable distant parameterisation that may completely upset their configuration and lead to safety or integrity problems, especially hardware problems. For instance, the control of the beverage's heater or pump may be disturbed leading to destructive overpowering or to unsuitable powering which degrades the quality of beverages prepared with such machines. Moreover, this kind of interference may occur silently, i.e. without the user's knowledge until it is too late or without the user realizing it all when the quality of the beverage preparation is merely degraded by such inappropriate interference.

SUMMARY OF THE INVENTION

It is a preferred object of the present invention to provide a beverage preparation machine that can be connected in a network and that is protected against any upsetting involving a safety issue or a risk of damage or beverage preparation process degradation, and originating from the network, in particular in the form of a virus or other malware.

Therefore, the beverage preparation machine comprises: an arrangement for processing one or more beverage ingredients to dispense a beverage; a control unit connected to the ingredient processing arrangement for controlling the processing of the one or more beverage ingredients; and a communication module for communication with a network external to the beverage preparation machine.

Hence, the invention relates to a machine connectable to a data-exchange network, the machine being configured for preparing a beverage in particular from a pre-portioned beverage ingredient in a capsule or pod.

For instance, the machine is a coffee, tea, chocolate or soup preparation machine. In particular, the machine is arranged for preparing within the ingredient processing arrangement a beverage by passing hot or cold water or another liquid through a capsule or pod containing an ingredient of the beverage to be prepared, such as ground coffee or tea or chocolate or cacao or milk powder.

For example, the preparation machine comprises: a ingredient processing arrangement including one or more of a liquid reservoir, liquid circulation circuit, a heater, a pump and a beverage preparation unit arranged to receive capsules or pods for use and evacuate capsules or pods upon use; a housing having an opening leading into a seat to which capsules or pods are evacuated from the preparation unit; and a receptacle having a cavity forming a storage space for collecting capsules or pods evacuated to the seat into the receptacle to a level of fill. The receptacle is insertable into the seat for collecting capsules or pods and is removable from the seat for emptying the collected capsules or pods. Examples of such ingredient processing arrangements are disclosed in WO 2009/074550 and in PCT/EP09/053,368.

The network to which the communication module is connectable may be the internet, an intranet or a similar network to which one or more distant computers, servers and terminals are connected for communicating with the communication module of the beverage preparation machine.

In accordance with the invention, the communication module is prevented from controlling the ingredient processing arrangement.

Hence, unlike prior art networked beverage preparation machine, the ingredient processing arrangement is prevented from being operated or physically influenced via the network. Interferences that are prevented concern in particular interferences with the beverage preparation process or with a maintenance process, such as rinsing or descaling. Hence, the beverage preparation machine may not be remotely controlled in such a way as to upset machine components, such as a heater, a pump or the processing of sensor data in such a way as to raise a safety or integrity issue or to degrade the beverage preparation process, for instance by allowing a heater or pump to be excessively powered or by upsetting the beverage preparation settings in any manner, in particular such as to cause nuisance.

In other words, the communication module may not serve to command the ingredient processing arrangement, in particular a heater or a pump, directly or indirectly via the control unit of the machine. It follows that no program or instruction set received by the communication module will directly, or indirectly via the control unit, affect the beverage preparation process. The beverage preparation process of the beverage preparation machine will remain unaffected by any data exchange between the beverage preparation machine and network via the communication module.

The hardware of the beverage preparation-related parts of the machine, in particular the ingredient processing arrangement and the cooperating control unit with its dedicated interface, is protected against remote interference.

Typically, the control unit is prevented from accepting beverage preparation-related or service process-related control data from the communication module. In particular, the control unit is prevented from accepting any reconfiguration-related data or any data extending beyond a request for data in a unidirectional communication with the communication module.

Hence, the control unit may not be reprogrammed from a remote location to upset the beverage preparation process and in particular the control of components that may involve a safety issue if inappropriately operated and/or that may be destroyed.

Without controlling or participating to the control of the ingredient processing arrangement, the communication unit may be configured in the beverage preparation machine to monitor certain aspects of the machine and, in particular, communicate such aspects onto the network to a remote server.

In one embodiment, the control unit is arranged to communicate data to the communication module, the data relating to at least one of: the beverage preparation process; the ingredient processing arrangement; the control unit and/or beverage preparation settings. This information may then be communicated (or not) to a distant server and be processed for general or particular commercial or servicing or repair or counseling purpose.

In an even safer embodiment, the control unit is prevented from communicating with the communication module. In this case, the communication is not even unidirectional like above but inexistent. Hence, the control unit is configured to receive no signal at all from the communication module not even a signal for an information request. In this embodiment, no data communication channel is needed between the control unit and the communication module.

Typically, the ingredient processing arrangement comprises one or more sensors for measuring parameters of the status of the ingredient processing arrangement and/or the beverage preparation process. For instance, such sensors may include at least one of: temperature sensors, a pressure sensor, a flowmeter, an electric power sensor, an overheat sensor, a scale sensor, a water level sensor, an ingredient recognition sensor, etc. . . . Such sensors are usually connected to the control unit In an embodiment, the communication module can be arranged to receive information from at least one of the sensor(s). The communication module may be directly connected to the sensors, usually in parallel to the control unit, or it may be indirectly connected to the sensor(s) via the control unit and typically be communicated a sensor-related information after processing by the control unit.

Normally, the control unit is connected to a beverage preparation user-interface. The user would use this user-interface to operate the ingredient processing arrangement via the control unit.

Typically, the communication module is connected to a communication user-interface. The user would use this user-interface to retrieve information from the network or retrieve information therefrom.

Such user-interfaces may include screens and touch screens, buttons, switches, etc. . . . as known in the art.

In an embodiment, the control unit is connected to a beverage preparation user-interface and the communication module is connected to a communication user-interface, the beverage preparation user-interface and the communication user-interface being juxtaposed. In particular, the beverage preparation user-interface can be flush with the communication user-interface. The beverage preparation user-interface and the communication user-interface may be disposed in a single user-interface canvas. Hence, the disposition of the user-interfaces may be such as to appear like a single interface providing all the user-access to the control unit and the communication module.

Whereas the control unit and the communication module may be digitally and/or physically, entirely or partly, separated within the machine, the corresponding user-interfaces may be configured as an apparent single interface. Hence, the user is confronted with a single or concentrated user-interface arrangement to avoid the dispersion of his/her attention all over the beverage preparation machine.

Typically, the beverage preparation machine comprises a housing for housing: the ingredient processing arrangement;

the control unit; and the communication module. This housing would normally also bear the user-interfaces.

For instance, the communication module is arranged to receive from the network and communicate via user-communication means, such as a display and/or loudspeaker, information relating to at least one of: a need to carry out a particular service; a need to repair said machine; and information on a particular ingredient that is being processed in said machine. When the communication module is configured to monitor the machine operation and/or components of the machine, the corresponding information may be communicated to a distant server of the network for evaluation and generation of suggestions to the user, for instance, via the communication module. For example, via appropriate sensor systems, the communication module may monitor the ingredient consumption and suggest timely reordering when the stock of ingredient is low or send general information regarding the ingredient or beverage that is being processed for display on the machine. Instead of a mere suggestion to reorder ingredients, e.g. proportioned ingredients capsules, the system may be configured to proceed to automatic re-ordering when the ingredient stock is low.

The communication module may be arranged for remote monitor of the service periods, for instance for carrying out a descaling process or for general maintenance. The communication module may communicate various parameter of the ingredient processing arrangement and the control unit for diagnosis purposes and/or for carrying out a market survey as to the user's preferences, for instance the actually used ratios of different ingredients. Hence, a distant server may monitor the preferred volume of beverage dispensing with certain ingredients, etc. . . .

More generally, the communication module may be arranged to receive from the network and communicate via user-communication means, such as a display and/or loudspeaker, information relating to: handling of this type of machine by a user, e.g. provide an on-line user manual and/or beverage recipes; advertising relating to beverage preparation machines, accessories, one or more ingredients that are being processed or related products; general information relating to one or more ingredients for the beverage processing; and visualization and/or music for generating an ambiance relating to such beverages or preparations thereof or consumptions thereof; and news and/or weather forecast, etc. . . . . For example the communication module with the appropriate user-interface may be configured to permit distant ordering of ingredients via the network.

BRIEF DESCRIPTION OF THE DRAWINGS

The invention will now be described with reference to the schematic drawings, wherein.

DETAILED DESCRIPTION

Figure 1:
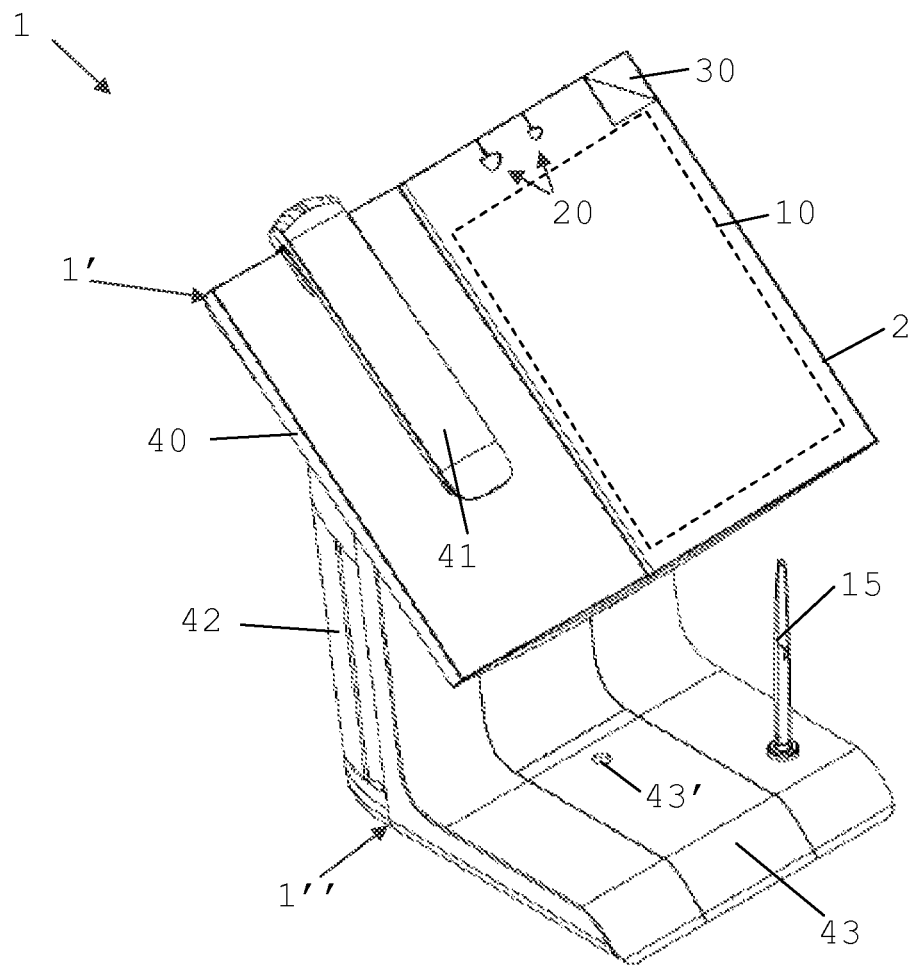
FIG. 1 shows a perspective view of a beverage machine according to the invention.
Figure 2:
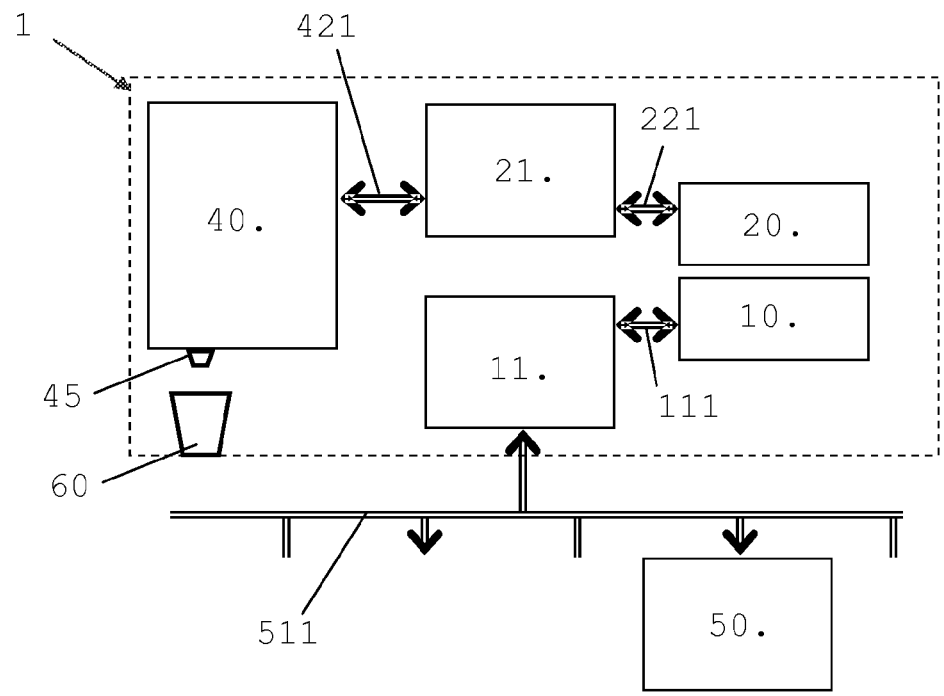
FIG. 2 schematically illustrates the functional architecture of a beverage preparation machine according to the invention within a network.
Figure 3:
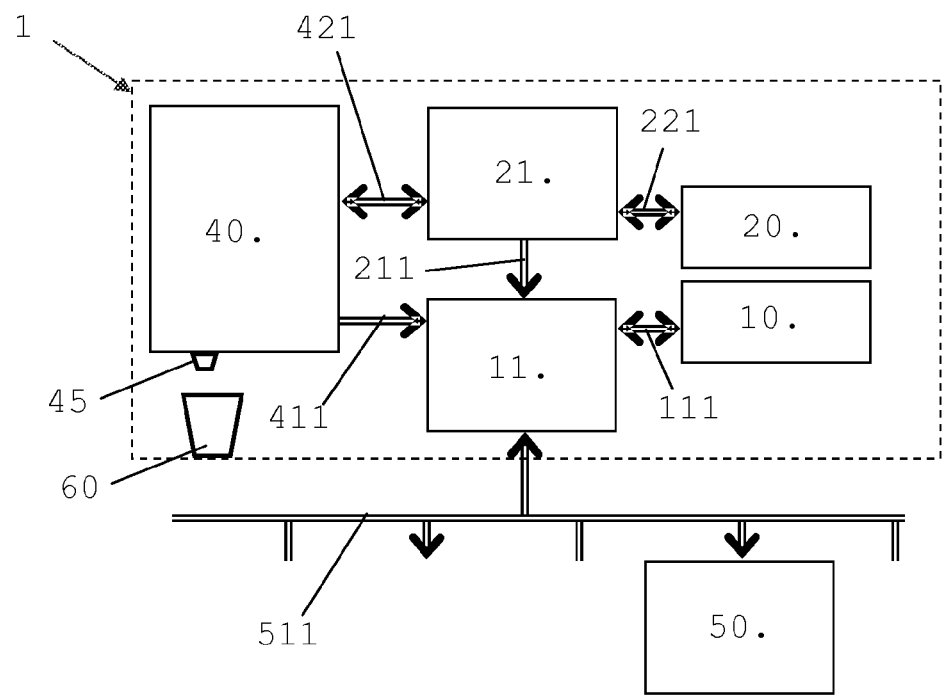
FIG. 3 schematically illustrates the functional architecture of another beverage preparation machine according to the invention within a network.

FIG. 1 shows a beverage preparation machine 1 according to the invention. FIGS. 2 and 3 illustrate two possible functional architecture of machine 1 within a network.

Beverage preparation machine 1 is an advanced design machine and has an open book-like part 1' on a foot-like part 1" having an general L-shape in cross-section. The interactive functionalities and general constructional information of such a machine are disclosed in greater details in PCT/EP09/058,540, the content of which is hereby integrated by way of reference.

Machine 1 has an arrangement 40 for processing one or more beverage ingredients to dispense a beverage, such as coffee. Arrangement 40 includes a water reservoir 42 connected to a water circulation circuit with a pump, a heater and a coffee brewing unit, as known in the art. The brewing unit is covered by a handle 41 pivotally mounted at the top of machine 1. Handle 41 serves to cover and uncover, respectively, a passage leading to the brewing unit and to open and close the brewing unit for introducing, allowing extraction and removing of a capsule containing ground coffee. Upon extraction, capsules are evacuated to a used capsule collector after reopening of the brewing unit. The used capsule collector is mounted at the back of a removable tray device 43 in foot 1". Tray device 43 has a generally flat cup support surface with an opening 43' for the evacuation of drips to the tray underneath. During use a cup 60 to be filled with a beverage is placed underneath beverage outlet 45 of ingredient processing arrangement 40, as schematically illustrated in FIGS. 2 and 3.

Beverage preparation machine 1 includes a control unit 21 connected to a user-interface 20 via a bidirectional data communication channel 221. Interface 20 includes a pair of push buttons for allowing a user to request the dispensing of small or large volumes of beverages, e.g. espressos or lungos.

Control unit 21 is connected to the ingredient processing arrangement 40 for controlling the processing of the beverage ingredients. Typically, control unit 21 will control the powering of a heater and a pump and adjust the powering based on measured parameters of the beverage preparation process via sensors, such as temperature sensors, pressure sensors and flowmeters. Moreover, the control of the components of the ingredient processing arrangement 40 may be adjusted to the type of ingredient capsule extracted upon automatic recognition thereof via a capsule recognition system as known in the art, for instance an electromagnetic, mechanical, colour or barcode recognition system.

Hence, ingredient processing arrangement 40 includes a series of sensors for returning information to control unit 21 relating to the state of arrangement 40 and of the beverage preparation process. Communication between control unit 21 and beverage preparation 41 is achieved via a bidirectional communication channel 421.

Furthermore, beverage machine 1 has a communication module 11 for bidirectional communication with an external network 511, such as the internet or an intranet. Communication module 11 is connected to a user-interface 10 in the form of a touch screen via a bidirectional data communication channel 111. Touch screen 10 may be operated by finger touch or by way of a stylus 15.

Control unit 11, communication module 21 and ingredient processing arrangement 40 are all contained within the housing of beverage machine 1.

In accordance with the invention, communication module 11 is permanently prevented from controlling the processing of the beverage ingredients. In other words, communication module 11 of beverage machine 1 may not act directly or indirectly via control unit 21 on arrangement or affect the beverage preparation process or other processes carried out by arrangement 40.

Control unit 21 is prevented from accepting beverage preparation-related control data from communication module 11.

In the architecture of FIG. 3, the control unit 21 is arranged to communicate data to communication module 11 via unidirectional data communication channel 211. With the exception of a request for information and the signals necessary to ensure proper communication, e.g. data transmission control signals, control unit 21 will not receive any data from communication module 11. Conversely, the data transferred from control unit 21 to communication module 11 may relate to at least one of: the beverage preparation process; ingredient processing arrangement 40; beverage preparation settings stored in control unit 21; and/or the state of control unit 21, e.g. in the view of identifying any malfunctioning at a station 50 remotely connected to network 511.

It is also possible to connect communication module 11 directly to the sensors in the beverage preparation module 40. Likewise, communication between beverage preparation module 40 and communication module 11 is unidirectional via bus 411. However, this communication channel may become redundant if the data relating to the beverage preparation module 40 can be communicated to the communication module 11 via control unit 21. Communication channel 411 is particularly useful in the absence of communication channel 211, for instance when the control unit 21 should benefit from an increased protection against network 511.

Communication module 11 is arranged to receive from said network and communicate via user-communication interface, such as display 10 and/or loudspeaker, information relating to at least one of: a need to carry out a particular service, e.g. descaling; a need to repair said machine; and information on a particular ingredient that is being processed in said machine. For such information to be sent to communication module 11, corresponding information is first gathered together by communication module 21 from control unit 21 and/or ingredient processing arrangement 40 and sent to a remote server 50 that processes and analyses the information before returning, when appropriate warnings or other information to communication module 11 via network 511.

In the architecture of FIG. 2, control unit 21 is prevented from communicating at all with communication module 11, not even unidirectionally. There is no data communication channel between control unit 21 and communication module 11.

The highest degree of safety is achieved when communication module 11 is connected neither to control unit 21 nor to beverage preparation module 40. A slightly inferior protection is achieved when communication module 11 is allowed to read, via a unidirectional channel, sensors of beverage preparation module 40. A still lower safety is obtained when communication module is allowed to obtain information from control unit 21. To ensure immunity against any upsetting of ingredient processing arrangement 40 and the control unit 21 via network 511, the possibility, in particular any physical possibility, for communication module 11 to change parameters of the control unit 21 or beverage preparation unit 40 should be avoided.

As shown in FIG. 1 beverage preparation user-interface 20 is flush with communication user-interface 10. As illustrated in FIG. 1, screen 2 of touch screen 10 extends sideways beyond the boundaries of activity of touch screen 10, as delimited by the dotted lines in FIG. 1, and user push buttons 20 extend via openings at the periphery of screen 10.

Hence, beverage preparation user-interface 20 and communication module interface 10 are formed in the same canvas 2 to increase the interfaces' user-friendliness and ergonomics.

Furthermore, canvas 2 bears a master switch 30 in its upper right corner. This switch is arranged to connect and disconnect the powering of the various components of the beverage preparation machine, including communication module 11, control unit 21 and ingredient processing arrangement 40 all powered by the same power source, typically the mains.

Generally, communication module 11 can be arranged to receive from the network 511 and communicate via user-communication interface, such as a display 10 and/or loudspeaker, information relating to: handling of such machine 1 by a user; advertising relating to such machine 1 or related machines, accessories, and/or one or more ingredients for the beverage processing; general information relating to one or more ingredients for the beverage processing; visualization and/or music for generating an ambiance relating to said beverage or preparation thereof or consumption thereof; and news and/or weather forecast.

The invention claimed is:

1. A beverage preparation machine comprising:
an ingredient processing arrangement for processing one or more beverage ingredients to dispense a beverage;
a control unit connected to the ingredient processing arrangement, the control unit configured for controlling the processing of the one or more beverage ingredients;
a communication module for communication with an external network and configured such that the only communication that can be received by the control unit from the communication module is a request for data, the communication module is prevented from controlling the ingredient processing arrangement; and
a housing that contains the ingredient processing arrangement, the control unit, and the communication module, and the communication module is arranged to receive information from the external network and communicate the information through a user-communication interface that is part of the housing.

2. The machine of claim 1, wherein the control unit is arranged to communicate data to the communication module, the data relating to at least one parameter selected from the group consisting of:
the processing of the one or more beverage ingredients;
the ingredient processing arrangement;
beverage preparation settings; and
the control unit.

3. The machine of claim 1, wherein the ingredient processing arrangement comprises one or more sensors for measuring parameters of the ingredient processing arrangement and/or the processing of the one or more beverage ingredients.

4. The machine of claim 3, wherein the communication module is arranged to receive information from at least one of the one or more sensors.

5. The machine of claim 3, wherein at least one of the one or more sensors is unconnected to the communication module.

6. The machine of claim 1, wherein the control unit is connected to a beverage preparation user-interface.

7. The machine of claim 6, wherein the beverage preparation user-interface and the communication user-interface are juxtaposed.

8. The machine of claim 7, wherein the beverage preparation user-interface is flush with the communication user-interface.

9. The machine of claim 7, wherein the beverage preparation user-interface and the communication user-interface are disposed in a single user-interface canvas.

10. The machine of claim 1, wherein the information received by the communication module from the external network and communicated through the user-communication interface relates to at least one state selected from the group consisting of:
- a need to carry out a particular service;
- a need to repair the machine; and
- information on a particular ingredient that is being processed in the machine.

11. The machine of claim 1, wherein the information received by the communication module from the external network and communicated through the user-communication interface relates to at least one parameter selected from the group consisting of:
- handling of the machine by a user;
- advertising;
- general information relating to one or more ingredients for the beverage processing;
- visualization and/or music for generating an ambiance relating to the beverage or preparation thereof or consumption thereof;
- news; and
- weather forecast.

12. A beverage preparation machine comprising:
- an ingredient processing arrangement configured to process one or more beverage ingredients to dispense a beverage;
- a control unit connected to the ingredient processing arrangement, the control unit configured to control the processing of the one or more beverage ingredients; and
- a communication module configured to communicate with an external network such that the only communications that can be received by the control unit from the communication module are a request for data and signals that control data transmission, and the communication module is prevented from controlling the ingredient processing arrangement; and
- a housing that contains the ingredient processing arrangement, the control unit, and the communication module, and the communication module is arranged to receive information from the external network and communicate the information through a user-communication interface that is part of the housing.

13. A beverage preparation machine comprising:
- an ingredient processing arrangement configured to process one or more beverage ingredients to dispense a beverage;
- a control unit connected to the ingredient processing arrangement, the control unit configured to control the processing of the one or more beverage ingredients; and
- a communication module configured to communicate with an external network, wherein there is no data communication channel between the control unit and the communication module such that communication between the control unit and the communication module is inexistent, and the communication module is prevented from controlling the ingredient processing arrangement; and
- a housing that contains the ingredient processing arrangement, the control unit, and the communication module, and the communication module is arranged to receive information from the network and communicate the information through a user-communication interface that is part of the housing.

14. The machine of claim 13, wherein the ingredient processing arrangement comprises a sensor that obtains a measurement of a parameter of the processing of the one or more beverage ingredients, and the communication module is arranged to directly receive the measurement from the sensor.

15. The machine of claim 13, wherein the ingredient processing arrangement comprises a sensor that obtains a measurement of a state of the control unit and/or the ingredient processing arrangement, and the communication module is arranged to directly receive the measurement from the sensor.

16. The machine of claim 13, wherein the information received by the communication module from the external network and communicated through the user-communication interface relates to at least one state selected from the group consisting of:
- a need to carry out a particular service;
- a need to repair the machine; and
- information on a particular ingredient that is being processed in the machine.

17. The machine of claim 13, wherein the information received by the communication module from the external network and communicated through the user-communication interface relates to at least one parameter selected from the group consisting of:
- handling of the machine by a user;
- advertising;
- general information relating to one or more ingredients for the beverage processing;
- visualization and/or music for generating an ambiance relating to the beverage or preparation thereof or consumption thereof;
- news; and
- weather forecast.

* * * * *